United States Patent [15] 3,653,962

Akashi et al. [45] Apr. 4, 1972

[54] MAGNETIC RECORDING MEDIUM

[72] Inventors: Goro Akashi; Masaaki Fujiyama, both of Minami Ashigara Machi, Ashigara-Kamigum, Kanagawa, Japan

[73] Assignee: Fuji Photo Film Co., Ltd., Ashigara-Kamigun, Kanagawa, Japan

[22] Filed: June 11, 1969

[21] Appl. No.: 832,094

[30] Foreign Application Priority Data

June 11, 1968 Japan ....................43/40065

[52] U.S. Cl. ....................117/240, 117/235
[51] Int. Cl. ....................H01f 10/02
[58] Field of Search ....................117/235, 240, 239, 238; 252/62.55, 62.54

[56] References Cited

UNITED STATES PATENTS

| | | | |
|---|---|---|---|
| 997,498 | 7/1911 | Headson | 117/240 |
| 3,262,812 | 7/1966 | Falk | 117/235 |
| 3,502,584 | 3/1970 | Denes | 252/62.55 |

*Primary Examiner*—William D. Martin
*Assistant Examiner*—Bernard D. Pianalto
*Attorney*—Sughrue, Rothwell, Mion, Zinn & Macpeak

[57] ABSTRACT

This invention is directed to a magnetic medium of improved sensitivity and surface characteristics. The improved magnetic medium consists of a support coated thereon with a dispersion of a ferromagnetic powder being a mixture of (1) a ferromagnetic oxide powder, and (2) a ferromagnetic powder having an induction of at least 10,000 gauss, the weight ratio of (1) to (2) being from 9:1 to 3:7. Examples of (1) are $\gamma$—$Fe_2O_3$, $Fe_3O_4$ and $CrO_2$. Examples of (2) are Fe—Co alloy, Fe—Co—Ni alloy, Fe—Ni alloy and Co—Ni alloy.

9 Claims, 2 Drawing Figures

INVENTORS
GORO AKASHI
MASAAKI FUJIYAMA
BY
Sughrue, Rothwell, Mion, Zinn & Macpeak
ATTORNEYS

MAGNETIC RECORDING MEDIUM

The invention relates to a magnetic recording medium and particularly to a composition of a magnetizable powder used in the magnetizable layer of magnetic recording medium.

Magnetic recording media hitherto known, include sound recording tape, memory tape and picture recording tape, and the magnetic recording media are formed by applying a suspension of a magnetizable powder of iron oxide, such as $\gamma$—$Fe_2O_3$ or $Fe_3O_4$, to a film support made of a synthetic resin, such as polyethylene terephthalate or cellulose diacetate, or to a support made of a non-magnetic metal, such as aluminum or brass, and drying the coating layer to form a magnetizable layer. However, the saturated magnetic flux density (Bm) of the prior magnetizable layer containing an iron oxide-type magnetizable powder was at most about 1,350 gauss. Nevertheless, the Bm value of the $\gamma$—$Fe_2O_3$ itself is as high as 5,200 gauss. This reduction of flux density occurs since the magnetizable powder is mixed with a binder for forming a magnetizable layer and the proportion of the magnetizable powder is restricted to, at most, 26 percent by volume of the magnetizable layer so as to provide a sufficient mechanical strength to the magnetizable layer. The proportion of the magnetizable powder in the magnetizable layer (loading density) is small, and consequently the characteristic of the magnetizable material itself is diluted. In addition, the influence of blowholes resulting from air bubbles which are naturally involved in the magnetizable layer when a coating liquid of magnetizable composition is applied to a support and dried to form the magnetizable layer cannot be ignored. Even if the $\gamma$—$Fe_2O_3$ is replaced by a $Fe_3O_4$ powder having a greater Bm value than $\gamma$—$Fe_2O_3$, the Bm value of the resulting recording medium is at most 1.2 times that of a recording medium containing $\gamma$—$Fe_2O_3$ as a magnetizable powder. In case of a $CrO_2$ powder, the Bm value is only about 1.4 times that of a $\gamma$—$Fe_2O_3$ powder.

On the other hand, where the $\gamma$—$Fe_2O_3$ is replaced by an alloy-type magnetizable powder, there is obtainable a recording medium having a Bm value four times that of a recording medium having the $\gamma$—$Fe_2O_3$ as a magnetizable powder. However, it was heretofore impossible to produce magnetic recording media having an excellent surface characteristic (smoothness on the surface of magnetizable layer) using such alloy-type magnetizable powders because they have poor compatibility with the binder.

In the technical field of magnetic recording there is a demand for recording of a high sensitivity and for development of magnetic recording media having a high magnetic flux density, and good surface characteristics and an improved sensitivity.

It is an object of the present invention to provide magnetic recording films of higher flux value and excellent surface characteristics.

In accord with the above object, we have discovered an improved magnetic recording media which consists of a support having coated thereon a magnetic recording layer consisting of ferromagnetic powder dispersed in a binder, said ferromagnetic powder characterized in that it is a mixture in the ratio of 9:1 to 3:7 of (1) a powder of a magnetized material selected from the group consisting of ferromagnetic iron oxides, ferromagnetic chromium dioxide and mixtures of such with a Co, Ni or a like metal and (2) a powder of a ferromagnetic material having a magnetic induction (Bm) of at least 10,000 gauss.

Figure 2:
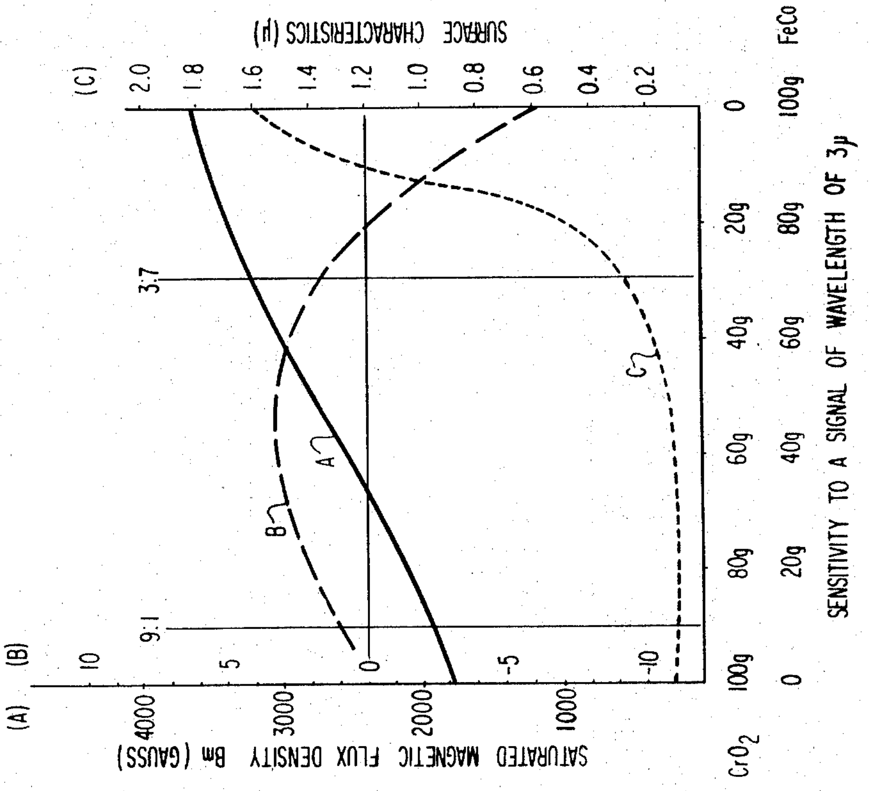
FIG. 2 is a plot of these values for the magnetic film of Example 4.

The magnetic material used in the present invention as the magnetizable material of the group (1) includes ferromagnetic iron oxides, such as $\gamma$—$Fe_2O_3$ and $Fe_3O_4$, and ferromagnetic materials obtained by adding Co, Ni, or Zn to such iron oxides. There may also be used ferromagnetic chromium dioxide and its equivalents obtained by adding thereto Te, Sb, Fe, Pt, for example $CrO_2$ (Te), $CrO_2$ (Sb), $CrO_2$ (Fe, Pt) and the like.

The ferromagnetizable material of group (2) which can be used in admixture with the magnetizable material of group (1) to attain the object of the present invention, has a Bm value of at least 10,000 gauss and includes Fe, Fe—Co alloys, Fe—Co—Ni alloys of a Ni content not exceeding 83 percent, *(*For example, Fe—Co—Ni alloy containing 65% Fe, 30% Co and 5% Ni.) Fe—Ni alloys, Co—Ni alloys of a Ni content not exceeding 70 percent, and alloys obtained by adding to such aforementioned alloys a Cu, Cr, Mn, Zn or the like metal to improve their magnetic characteristics.

The magnetizable materials of groups (1) and (2) may be a mixture of two or more materials listed within each group. It is better, with respect to magnetic recording, that the magnetizable materials to be mixed have the same cohesive force. To obtain such, there is added to the respective magnetizable materials a Co, Mn, Te, Cr, Cu, Be or other metal as an impurity.

For the manufacture of the magnetic recording medium of the present invention, the ferromagnetic powder of the group (1) and the ferromagnetic powder of the group (2) admixed in the ratio of the former to latter of from 9:1 to 3:7 (weight ratio) is dispersed in a magnetic recording layer.

The present invention will now be illustrated in more detail by the following Examples.

COMPARATIVE EXAMPLE 1

28 g. of a polyvinyl chloride acetate, 9 g. of dibutyl phthalate and 1 g. of castor oil, as ingredients of a binder, and 100 g. of a magnetic Fe—Co—Ni alloy powder * (*Fe—Co—Ni alloy containing 65% Fe, 30% Co and 5% Ni.) of average dimensions of 0.6 × 0.1 × 0.1 micron were subjected to dispersion and mixing treatment in a ball mill for 4 days using ethyl acetate as a dispersing medium. The resulting suspension was applied to a polyethylene terephthalate film 24 microns thick and dried to give a coating film of 5 microns thick. The coated film was then treated by means of a glossing roll and split into tapes to obtain a magnetic recording tape.

The magnetic recording tape thus obtained was tested to determine the saturated magnetic flux density. A Bm value of 3,470 gauss was measured. This was far improved compared with that of a magnetic recording tape prepared using an iron oxide-type magnetizable powder. However, according to a microscopic observation, the surface of the tape was very rough and the degree of roughness was, in average, about 1.6 microns. Accordingly, the tape could not be used as a magnetic tape for recording short wave lengths.

COMPARATIVE EXAMPLE 2

28 g. of a polyvinyl chloride acetate, 9 g. of dibutyl phthalate and 1 g. of castor oil, as components of a binder, and 100 g. of a needle-like $\gamma$—$Fe_2O_3$ were subjected to dispersion and mixing in a ball mill for 4 days using ethyl acetate as a dispersing medium. The resulting suspension was applied to a 24 micron thick polyethylene terephthalate film and dried to give a coating film 10 microns thick. The coated tape was treated with a glossing roll and slit into tapes to obtain a magnetic recording tape.

Although the surface characteristic of the magnetic recording tape thus obtained was very good as indicated by an average roughness of less than about 0.2 micron, the saturated magnetic flux density of 1,340 gauss compared to the prior art products, so that it was unsuitable for use as a high sensitivity magnetic recording material.

COMPARATIVE EXAMPLE 3

In this Example, the binder was changed in order to improve the loading density of magnetizable powder. The effect of an epoxy resin, acrylic resin, cellulosic resin or like binder, and of a dispersant (for improving dispersion of magnetic dust), such as poly (oxyethylene) alkyl ethers, poly (oxyethylene) alkyl esters, sorbitol fatty acid esters, cationic quaternary ammonium salts, alkylpyrridinium salts or anionic alkyl phosphates, alkyl sulfates or like additive, was studied for $\gamma$—$Fe_2O_3$ and alloy-type magnetic mediums. In the case of the alloy-type magnetizable material, the surface roughness of the resulting recording media was as large as about 1.3 micron. In the case of the $\gamma$—$Fe_2O_3$, the saturated magnetic flux density was as low as 1,350 to 1,370 gauss. Both were unsuitable as high sensitivity magnetic recording media in short wave length regions.

EXAMPLE 1

28 g. of polyvinyl chloride acetate, 9 g. of dibutyl phthalate and 1 g. of castor oil, as components of a binder, and 42 g. of a needle-like powder of $\gamma$—$Fe_2O_3$ of dimensions, in average, of 0.7 × 0.14 × 0.14 micron, and 58 g. of a magnetizable powder of Fe—Co—Ni * (*Fe—Co—Ni alloy containing 65% Fe, 30% Co and 5% Ni. alloy of dimensions, in average, of 0.6 × 0.1 × 0.1 micron, were subjected, together with ethyl acetate, to dispersion treatment in a ball mill for 4 days, and the resulting suspension was applied to a 24 micron thick polyethylene terephthalate film to give a dry coating film of 5 microns thick. The coated film was then treated by means of a glossing roll and slit into tapes to obtain a magnetic recording tape.

The saturated magnetic flux density of the tape was 2,460 gauss and the surface characteristic of the tape, in terms of surface roughness, averaged about 0.2 micron. Thus, there was obtained a magnetic recording tape having balanced flux density and surface characteristic.

EXAMPLE 2

28 g. of a polyvinyl chloride acetate, 9 g. of dibutyl phthalate and 1 g. of castor oil as components of a binder and 40 g. of a $CrO_2$ dust of dimensions, in average, of 0.65 × 0.1 × 0.1 micron, and 60 g. of a magnetizable powder of Fe—Co—Ni * (*Fe—Co—Ni alloy containing 65% Fe, 30% Co and 5% Ni.) alloy of dimensions, in average, of 0.6 × 0.1 × 0.1 micron, were subjected to dispersion and mixing in a ball mill for 4 days. The resulting suspension was applied to a 24 micron thick polyethylene terephthalate film and dried to give a coating film 5 microns thick. The so coated film was then treated with a glossing calendar roll and split into tape to obtain a magnetic recording tape.

The saturated magnetic flux density of magnetizable powder in the magnetic recording tape thus obtained was as high as 2,640 gauss, and the surface roughness was 0.25 micron, so that it was very suitable for use as a magnetic recording media for high density recording.

EXAMPLE 3

28 g. of a cellulose nitrate, 9 g. of dibutyl phthalate and 1 g. of castor oil, as components of a binder, and (in total) 100 g. of a needle-like $\gamma$—$Fe_2O_3$ powder of dimensions, in average, of 0.5 × 0.08 × 0.08 microns and a magnetizable powder of a Fe—Co—Ni * (*Fe—Co—Ni alloy containing 65% Fe, 30% Co and 5% Ni.) alloy of dimensions, in average, of 0.4 × 0.07 × 0.07 micron, were subjected to dispersion and mixing in a ball mill for 4 days. The resulting suspension was applied to a 24 micron thick polyethylene terephthalate film and dried to give a coating film of 5 microns. The so coated film was then treated by means of a glossing roll and slit into tapes to obtain a magnetic recording tape.

Figure 1:
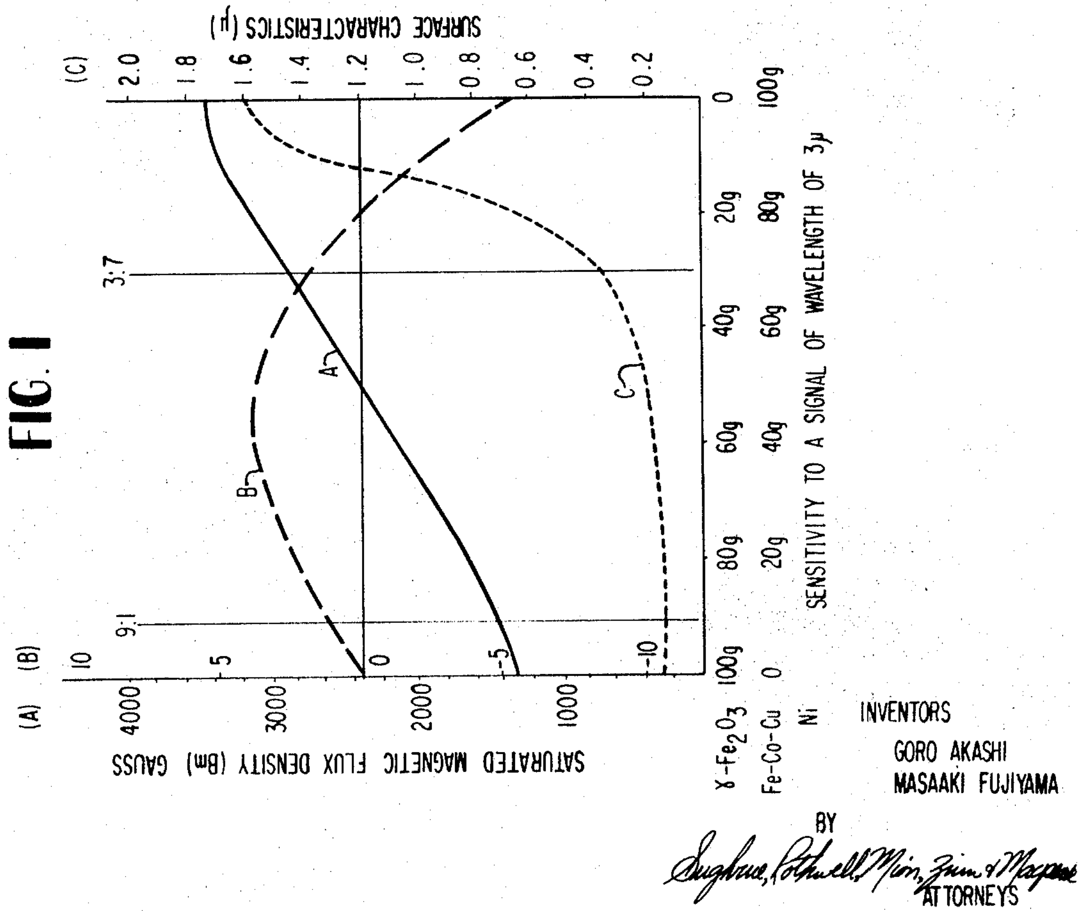
FIG. 1 is a plot of ferromagnetic powder composition against sensitivity, flux density and surface characteristics.

In FIG. 1 there is plotted the measured values of saturated magnetic flux densities of the magnetic recording tapes thus obtained. FIGS. 1 and 2 indicate the relationships between the composition of magnetizable powder used in magnetic recording media and the surface characteristic, saturated magnetic flux density and sensitivity to a signal of a wave length of 3 microns of the magnetizable layers.

On the abscissa there is graduated the proportion of $\gamma$—$Fe_2O_3$ dust and Fe—Co—Ni alloy dust in the magnetic dust, the left end corresponding to 100 g. of $\gamma$—$Fe_2O_3$ powder and the right end corresponding to 100 g. of the alloy powder. On the left ordinate there is graduated, on the left side, (A) the saturated magnetic flux density in gauss, and at the right side (B), the sensitivity to a signal of a wave length of 3 microns in dB and, on the right ordinate, there is graduated the surface characteristic in microns. FIG. 1, the curve A(— — —) represents the saturated magnetic flux density of the magnetic recording tapes, curve B (– – ) the sensitivity, and curve C(. . . . .) the surface characteristic.

From the individual curves, as indicated in FIG. 1, the following will be understood: The saturated magnetic flux density increases substantially proportionally to the increase of the content of the alloy magnetizable material in the magnetizable powder (curve A). But, in the case where the magnetizable powder consists only of alloy magnetizable powder, the magnetic flux density is somewhat lower than the anticipated value. This is probably due to the decrease of the apparent value owing to agglomeration of particles of the magnetizable alloy powder. From the curve C, it will be noticed that the surface characteristic suddenly worsens when the content of the magnetizable alloy powder exceeds 70 percent by weight and, from curve B, that the sensitivity of the magnetic recording tape to a signal of a wave length of 3 microns is improved when about 10 to 70 percent by weight of the magnetizable powder consists of a magnetic alloy powder.

EXAMPLE 4

A suspension of a $CrO_2$ powder of average dimensions of 0.47 × 0.07 × 0.07 microns, and a Fe—Co magnetic alloy powder was prepared by adding 1 g. of lecithin to a binder of the same composition as Example 3 and subjecting the dispersion to mixing in a ball mill for 4 days. The resulting suspension was applied to a 24 micron thick polyethylene terephthalate film to give a dry coating film of a thickness of 5 microns. The coated film was then glossed and split to obtain a magnetic recording tape. The characteristics of the magnetic recording tape thus obtained were plotted in FIG. 2. FIG. 2, similar to FIG. 1, indicates that, while the saturated magnetic flux density increases in proportion to the content of the magnetizable alloy powder in the magnetizable powder, the surface characteristic suddenly worsens when the content of the magnetizable alloy powder exceeds 70 percent by weight. Accordingly, in cases where there is used a combination of a $CrO_2$ dust and a magnetizable alloy powder as in this example, the expected advantage of the present invention is obtainable in the range of the magnetizable alloy powder content of up to 70 percent by weight.

EXAMPLE 5

Magnetic recording materials were manufactured selecting a $Fe_3O_4$ dust from the group (1) and various magnetizable alloy powders from the group (2) as magnetizable powder, and using the same binder composition as in Example 1. The characteristics of the resulting magnetic recording media were determined. The results obtained indicated that the loading density increased in proportion to the amount of the magnetizable alloy powder added while the surface characteristic suddenly worsened when the amount of the magnetizable alloy powder exceeded 70 percent by weight.

It will be understood from the results of the above examples, in accordance with the present invention, the saturated magnetic flux density of a $\gamma$—$Fe_2O_3$, $Fe_3O_4$ or $CrO_2$ containing magnetizable layer is improved by combining the $\gamma$—$Fe_2O_3$, $Fe_3O_4$ or $CrO_2$ with a ferromagnetic alloy powder, without the inherent drawback of the magnetic alloy powder when used alone. According to the results of further investigations the advantage of the present invention was observed when there was used, as a magnetic material of group (1), a mixture of $\gamma$—$Fe_2O_3$, $Fe_3O_4$ and $CrO_2$. There was also observed a worsening of the surface characteristic when the amount of the magnetizable alloy powder added exceeded 70 percent by weight. Similar results were obtained when there was used a different binder.

The sensitivity of the magnetic recording medium of the present invention is several dB higher than that of the prior magnetic recording medium prepared using a magnetizable material belonging to the group (1), as mentioned above, as the sole magnetizable material, since the electric resistance of the magnetic recording layer is sufficiently lowered by the presence of the magnetizable alloy powder. The magnetic recording media of the present invention is free from adverse effect of static electric charges on magnetic record.

What is claimed is:

1. A magnetic recording medium comprising a support having coated thereon a magnetic recording layer formed from a dispersion of a mixture of ferromagnetic powders in a binder, said mixture consisting essentially of (1) a ferromagnetic oxide powder, and (2) a ferromagnetic metal powder having a magnetic induction of at least 10,000 gauss, the weight ratio of (1) to (2) being from 9:1 to 3:7.

2. The magnetic recording medium of claim 1 in which the ferromagnetic oxide powder is selected from the group consisting of iron oxide, chromium dioxide, iron oxide mixed with Co, Ni, or Zn, chromium dioxide mixed with Te, Sb, Fe or Pt, and mixtures thereof; and in which the ferromagnetic metal powder having a magnetic induction of at least 10,000 gauss is selected from the group consisting of Fe, Fe—Co alloys, Fe—Co—Ni alloys in which the nickel content is less than 83 percent, Fe—Ni alloys, Co—Ni alloys containing less than 70 percent nickel, alloys of the above with a metal selected from the group consisting of Cu, Cr, Mn, and Zn, and mixtures thereof.

3. The magnetic recording medium of claim 2 in which the ferromagnetic oxide powder is an iron oxide.

4. The magnetic recording medium of claim 2 in which the ferromagnetic oxide powder is a chromium dioxide.

5. The magnetic recording medium of claim 3 in which the iron oxide is selected from the group consisting of $\gamma$—$Fe_2O_3$ and $Fe_3O_4$.

6. The magnetic recording medium of claim 2 wherein said Fe—Co—Ni alloy contains about 65 percent iron, about 30 percent cobalt and about 5 percent nickel.

7. The magnetic recording medium of claim 1 wherein said ferromagnetic oxide powder and said ferromagnetic powder having a magnetic induction of at least 10,000 gauss both have about the same cohesive force due to the presence in at least one member selected the group consisting of said ferromagnetic oxide powder and said ferromagnetic powder having a magnetic induction of at least 10,000 gauss of a metal impurity selected from the group consisting of cobalt, manganese, tellurium, chromium, copper and beryllium.

8. The magnetic recording medium of claim 1 wherein said ferromagnetic oxide powder comprises a mixture of $\gamma$—$Fe_2O_3$, $Fe_3O_4$ and $CrO_2$.

9. The magnetic recording medium of claim 1 wherein said mixture contains from 10 to 70 percent by weight, of a magnetic alloy powder.

* * * * *